July 25, 1933.  E. R. EVANS  1,919,882
BRAKE CONSTRUCTION
Filed June 22, 1929  2 Sheets-Sheet 1
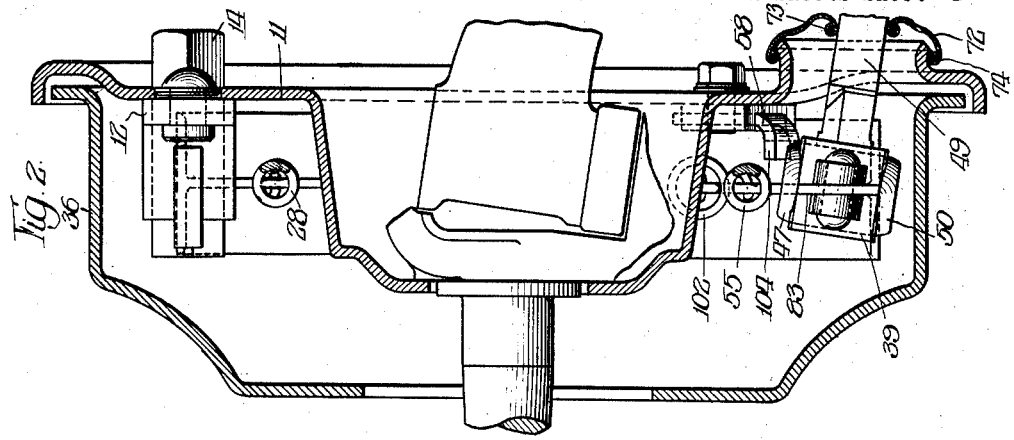
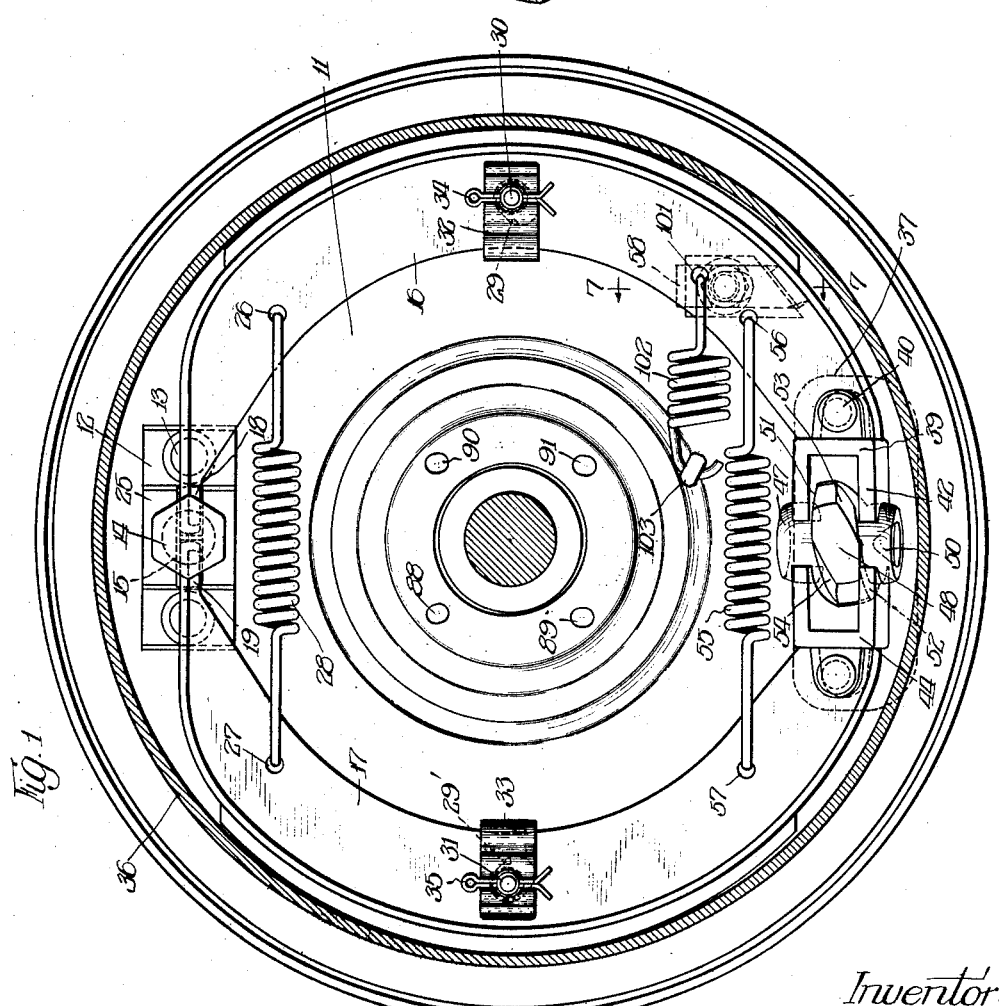
Inventor:
Edwin R. Evans,
By Wilkinson Huxley Byron + Knight
attys.

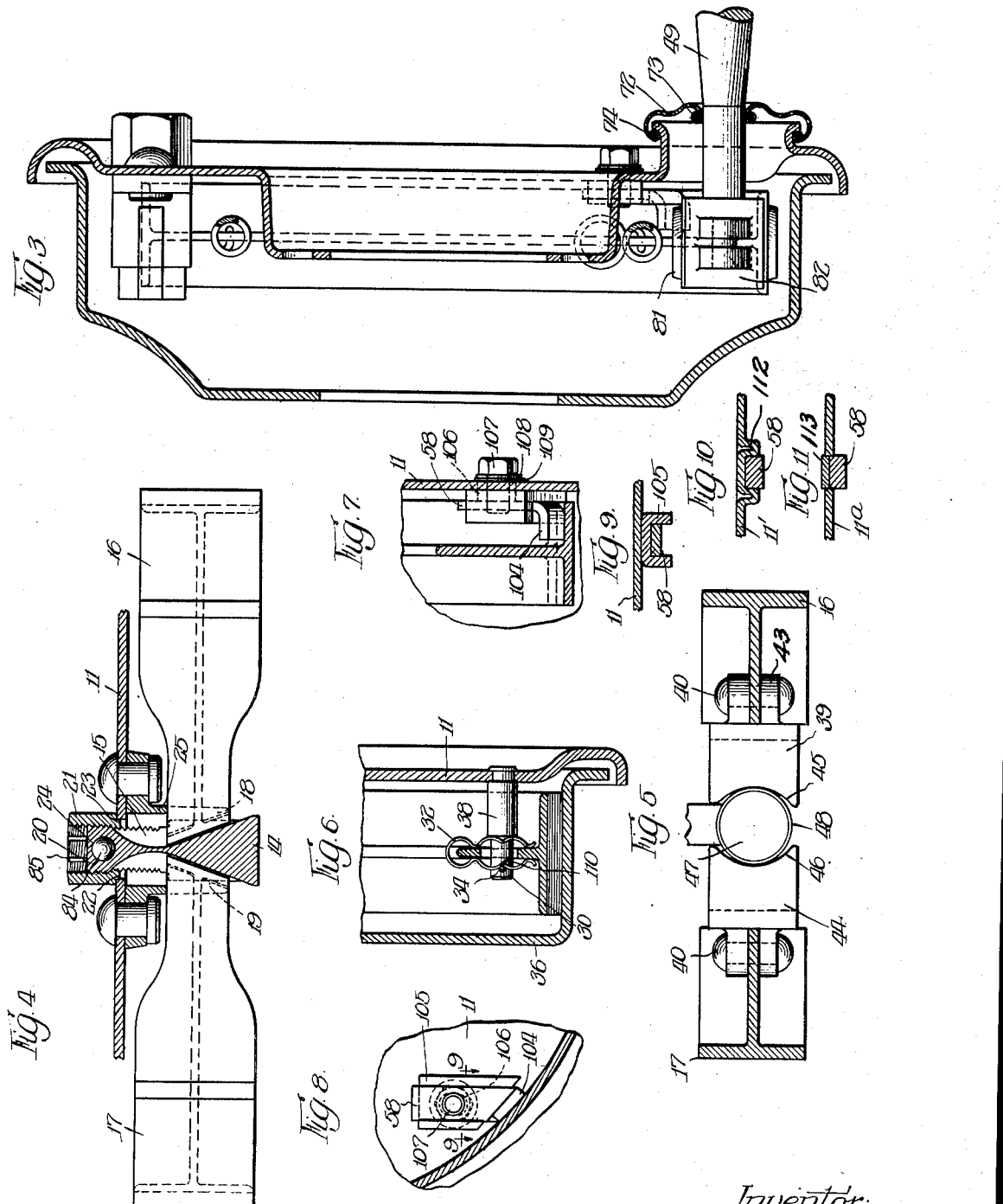

Patented July 25, 1933

1,919,882

UNITED STATES PATENT OFFICE

EDWIN R. EVANS, OF CHICAGO, ILLINOIS

BRAKE CONSTRUCTION

Application filed June 22, 1929. Serial No. 372,833.

This invention relates to a new and improved brake construction for use in connection with vehicle wheels, and more particularly to such construction involving a pair of pivoted brake shoes. The invention particularly relates to a form of centralizer for such shoes, and to a construction whereby the braking effect of the wrapping and unwrapping shoes is equalized in normal braking operation.

This invention is in the nature of a modification or improvement on that shown in my copending application for brake construction, Serial No. 366,217, filed May 27, 1929.

It is an object of the present invention to provide a new and improved brake construction which is efficient in design and operation.

It is a further object to provide a brake mechanism including pivoted brake shoes and means for neutralizing the self-energizing effect of such shoes.

It is an additional object to provide a new and improved centralizer for brake shoes together with improved means for securing in place and adjusting such centralizer.

It is also an object to provide a new and improved anti-rattler means for such brake shoes.

It is a further object to provide brake shoes having new and improved anchoring and adjusting means.

It is an additional object to provide a brake assembly including a new and improved brake operating cam construction as well as an improved shoe construction.

It is also an object to provide a brake construction which is simple in design and adapted for commercial production and use.

Other and further objects will appear as the description proceeds.

I have shown certain preferred embodiments of my invention in the accompanying drawings, in which—

Figure 1 is an elevation of the brake construction with the brake drum cut away;

Figure 2 is a vertical section of the construction shown in Figure 1;

Figure 3 is a view similar to Figure 2 but showing the brake construction applied to non-steering wheels;

Figure 4 is a fragmentary section showing the adjustment of the pivot ends of the brake shoes;

Figure 5 is a fragmentary section illustrating the brake cam construction;

Figure 6 is a fragmentary section showing the anti-rattler device;

Figure 7 is a fragmentary section taken on line 7—7 of Figure 1 showing the centralizer construction;

Figure 8 is a fragmentary face view of the centralizer construction;

Figure 9 is a section taken on line 9—9 of Figure 8;

Figure 10 is a section similar to Figure 9 but showing a modified form of construction; and Figure 11 is a section similar to Figure 9 and showing a further modified form of construction.

Referring first to Figures 1 and 2, the brake shoe supporting plate 11 is supported from a non-rotating portion of the vehicle and carries the brake anchor supporting member 12 which is secured to the plate 11 by means of rivets 13. The brake shoe anchor or pivot member 14 is shown as made from a hexagonal bar of steel and is carried in the supporting member 12. This member 14 is milled on opposite sides to form slots 15 which receive the pivoted ends of the brake shoes 16 and 17. As shown in Figure 4, these slots 15 are milled so that the bottoms of the slots are on an angle and the corresponding ends 18 and 19 of the brake shoes 16 and 17 are rounded and formed upon similar angles.

The outer portion 20 of the hexagonal pivot member 14 is circular in cross section, and is threaded to engage the nut 21. The nut 21 has a shoulder 22 and a reduced extension 23 which fits within an opening in the supporting plate 11, so that the nut is supported by and bears against that plate. The portion 20 of the hexagonal pivot member 14 is provided with a transverse drilled hole 24, which serves to receive a spring-pressed ball 84 which clicks against axial grooves 85 formed in the thread on the interior of the nut 21, and thus serves to audibly indicate the adjustment of the nut.

The member 14 is preferably formed of a hexagonal bar of steel, which section may be secured direct from the rolling mills made of correct dimensions and with a tolerance in manufacture such that it may be used without additional sizing or milling operations. In forming an opening in the supporting bracket or fixed member 12 for passage of the member 14, it is necessary that the opening conform to the outer contour of the member 14, so as to hold it against rotation. With the use of the hexagonal section this opening in the member 12 may be accomplished by drilling a hole and then broaching it to hexagonal form with the minimum loss of material and with the minimum of difficulty in the broaching operation.

It will be apparent that the anchor bracket member 12 may also be formed from a continuous rolled section. This may be handled in apparatus of a screw machine type being automatically drilled, then broached, then having the drilled and broached section cut off. The operation, therefore, may be continuous throughout a bar fed to the machine, and thus materially reduces the labor cost in the manufacture. As will be apparent from Figure 1 and 4, it will also be necessary to make a cross cut in the raised portion 25 of the fixed anchor bracket 12, this cross cut serving to provide openings for the entrance of the ends of the brake shoes 16 and 17, which ends pass through these cuts in the raised anchor bracket portion 25 and are seated in the slots 15 in the adjustable anchor member 14.

The brake shoes 16 and 17 are provided with the perforations 26 and 27 which receive the ends of a spring 28. This coil spring 28 is under tension and serves to hold the ends 18 and 19 of the brake shoes 16 and 17 in proper engagement in the base of the slots 15 in the adjustable anchor member 14.

The brake shoes 16 and 17 are also provided with slotted openings 29 and 29' indicated in broken lines in Figure 1. Through these openings pass the studs 30 and 31 which are carried by the supporting plate 11 and which studs carry the anti-rattler springs 32 and 33. These springs are held in place by cotter pins 34 and 35. This construction is illustrated in section in Figure 6, the brake drum being shown as 36. Figure 6 clearly shows that the spring 32 is bent upon itself so as to have portions lying upon each side of the web 37 of the brake shoe 16. The stud 30 has its lower portion 38 adjacent the supporting plate 11 of a larger size than its portion which passes through the opening in the web 37 of the brake shoe. The spring is held between the shoulder at the end of the enlarged portion 38 and the cotter pin 34. This serves to properly locate the brake shoe and a total play of one-eighth of an inch, for example, may be permitted by the spring. This play would include a one-sixteenth inch play in either direction. The cotter pin 34 rests in a transverse depression 110 formed in the anti-rattler spring 32. The cotter pin is made in such length that its straight portion extends the full width of the spring 32 and rests in this depression. The stud 30 is fixed to the backing plate 11 in such manner as to eliminate rotation of the stud and consequently the cotter pin 34 is maintained fixed in the position shown. By means of its position in the corrugation 110 of the spring 32, the spring is also maintained against rotation about its supporting stud 30. In this way the spring is maintained constantly in the proper operative position and cannot work into an angular position where its corner might catch the web of the shoe 16 and restrain it from movement or prevent its coming back to the proper neutral position, or its outer corners catch the flange of the shoe and prevent its proper return from contact with the shoe.

It will be noted that the pivoted ends 18 and 19 of the brake shoes are formed by turning over the ends of the flanges of the shoes, and by permitting a portion of the web to continue to the end of the shoe to engage the turned over flange portion and to be welded to it to support it. This construction is clearly shown in Figure 1. The turned over portion of the flange is rounded, so as to have a line contact with the base of the milled slots 15 in the adjustable anchor member 14, and is preferably hardened by suitable treatment.

As best shown in Figures 1 and 5, the cam bearing plate 39 is secured to the web 37 of the brake shoe 16 by means of a single rivet 40. The web 37 and the cylindrical flange of the shoe 16 are both preferably cut off so as to bear against the rear face of the member 39. This portion of the flange of the brake shoe is bent inwardly somewhat out of its cylindrical form to abut against the member 39 and provide the proper clearance for the cam at this point.

The major portion of the wear member 39 is channel shaped in section and the legs 42 of the channel have been shown as slightly flared. This flare permits these bearing members to be formed of a continuous rolled section. The section is rolled with a body in channel shaped form and with an upward upper rounded portion 43 which is afterwards slotted to receive the web 37 of the brake shoe and also drilled to receive the rivet 40. The wear member or cam bearing member 44 secured to the brake shoe 17 is similar in construction to that just described. As best shown in Figure 5, the members 39 and 44 have their legs provided with arcuate portions 45 and 46 to receive the end portion 47 of the brake operating cam 48. These arcuate portions serve to hold the cam 48 and the cam shaft 49 in position and to limit movement of the cam toward and away from the drum. The arcs of these arcuate portions are made greater in radius than those of the cam portion 47 so as to provide some brake release when the wheels are turned in steering.

The wear members 39 and 44 are preferably so secured to the brake shoes that they are upon a slight angle with the inner legs or upper legs as seen in Figure 1, constantly in engagement with the upper barrel shaped portion 47 of the cam member. This is for the purpose of neutralizing the error caused by adjusting the centralizer, to be described hereinafter, which adjustment is made with the pivot member 14 retracted and the shoes forced into engagement with the drum by such retraction. If this slight angle were not used, it will be seen that when the shoes were adjusted to clear the drum by moving the pivot inwardly there would be a pivoting of the shoes about the points of contact between the shoes and centralizer which would draw the wear plates slightly away from the cam and permit a rattle and wear due to looseness.

The brake operating cam 48 is operated through the brake operating arm 49. The details of construction of this arm and the method of brake operation form no part of the present invention, and need not be described in detail. As best shown in Figure 1, the brake cam 48 has the upper portion 47 and the lower portion 50, which are generally barrel shaped in contour. The intermediate portion of the cam is provided with the supporting cam surfaces 51 and 52 and with the shoulders 53 and 54. The lower end of the brake shoes 16 and 17 are pulled together by the coil spring 55 which has its ends hooked into perforations 56 and 57 in the brake shoes 16 and 17 respectively. The tension of the spring 55 thus holds the bearing members 39 and 44 normally in engagement with the upper and lower portions 47 and 50 of the operating cam member 48. The shoulders 51 and 52 bear against the members 44 and 39 respectively and serve to properly locate and support the cam member 48 in the bearing members. These surfaces 51 and 52 prevent the operation of the cams in the reverse direction. The surfaces 51 and 52 are so formed as to support the cam shaft at normal position and the cam surfaces 53 and 54 support the cam and cam shaft at any angle of shaft operation and serve to properly hold the cam shaft on center.

In order to operate the brakes the cam member 48 is rotated in the clockwise direction as seen in Figure 1. The cam surfaces 50 and 47 bear against the arcuate surfaces 46 and 45 formed in the lower arm of the member 44 and the upper arm in the member 39. The bearing of these cam surfaces against the arms, as the member 48 is rotated, serves to separate the lower end of the brake shoes, causing them to rotate about their upper pivot and to bring them into braking contact with the brake drum 36.

It will be noted from an examination of Figure 5 that the arcuate surfaces 45 and 46 formed on the legs of the bearing members are formed as arcs of circles of greater diameter than are the arcs which form the sides of the upper and lower barrel shaped portions 47 and 50 of the brake operating cam 48. This difference in arcuate radius prevents binding of the parts, particularly on front wheels which are pivoted and also has the additional function of reducing the braking effect when the wheels are turned. This reduction of braking on front wheels when the wheels are turned in steering around a curve is highly important.

The brake shoe 16 is further provided with a perforation 101 in which is hooked an end of the spring 102. The opposite end of the spring 102 is hooked through a stud 103 which is secured to the supporting plate 11. This spring 102 serves to draw the brake shoe 16 back against the centralizer 58 so that the cylindrical flange of the brake shoe bears against the outturned end 104 of the centralizer. This centralizer, as best shown in Figures 7 and 8, consists in a piece of flat steel having its end bent up to conform to the cylindrical inner surface of the flange of the brake shoe and is preferably formed of cold rolled steel. The upper portion of the centralizer fits between the upturned sides of the supporting clip 105 which may be formed of a bent-up U-shaped metal stamping with the middle of the U welded in place against the supporting plate 11. The supporting plate 11 is provided with a slotted opening 106 through which passes a cap screw 107. This cap screw 107 is threaded into the centralizer 58 and is provided with a washer 108 and lock washer 109 which bear against the outer face of the supporting plate 11. The centralizer slides vertically in the clip 105 and may be adjusted by loosening the cap screw 107 so that the centralizer 58 may slide vertically with the cap screw. As shown in Figure 10, instead of the clip 105 to hold the centralizer 58 in place, the back plate shown as 11' may be provided with the pressed ridges 112. A further alternative form of construction is shown in Figure 11 in which the section 113 is sheared from the plate 11ª at its edges and depressed to form a seat for the centralizer 58.

The large spring 102 is shown as attached to the brake shoe 16 in Figure 1, this shoe being the wrapping shoe on the forward left wheel and the brake drum 36 rotating in counterclockwise direction in Figure 1. The spring 102 serves to kill the self-energization of the wrapping or energized shoe. The spring may be designed, for example, to exert about 150 pounds pull-back on the shoe, pulling it back against the outturned end 104 of the centralizer 58 and maintaining it in contact with such centralizer. It will be noted that the line of movement of the centralizer is at an angle to the pull of the spring 102 so that the tendency of the spring to force the centralizer back is reduced. The line of the movement of the centralizer may be further modified to increase the resistance to the spring.

In the brake operation by rotation of the brake operating cam 48 in clockwise direction, as shown in Figure 1, the wear plate 39 of the shoe 16 therefore serves as an abutment against which the cam operates to force the shoe 17 against the brake drum 36 until the resistance of such brake shoe 17 is greater than that of the spring 102, after which the wrapping or energized shoe 16 is forced into engagement with the drum 36, and both shoes serve to then continue the braking operation. This heavy spring 102 also serves to act as a return spring for snapping off the wrapping or energized shoe 16 from contact with the brake shoe, operating against the wrapping on effect of the rotation of the drum. The spring 102 in combination with the centralizer 58 also has the effect of simplifying the centralizing feature so that one step only is necessary in order to bring about centralization of the shoes.

In order to centralize the shoes with the wheel brake drum 36 in place, the member 14 at the pivoted end of the shoes 16 and 17 is screwed outwardly to force the shoes into contact with the brake drum. It will be noted that the centralizer 58 contacts against the inner face of the flange of shoe 16 substantially in line with the contact face between the inner flange of the wear member 39 on shoe 16 and the corresponding operating face 47 of the brake operating cam member 48. Therefore, when the shoe is expanded against the brake drum the shoe 16 rocks about its point of contact with the operating cam 48 and the centralizer is then brought down against the inner face of the brake shoe and the cap screw 107 set up tightly to retain the centralizer 58 in this position. When the brake adjusting member 14 is screwed inwardly of the brake construction to permit the proper clearance between the brake shoes and the drum, the shoe rocks about its point of contact with the centralizer, but since this is in substantially the same horizontal line as that of the contact between the wear plate with the cam, the relative movement between the wear plate and cam is substantially vertical and therefore in line with their contact surfaces which reduces the possibility of any clearance at this point due to the adjustment.

As shown in Figures 2 and 3, a flexible boot 72 is provided which is secured to the brake lever arm 49 by a snap ring 73 and which may be similarly secured by a ring 74 to a flange 75 formed on the brake shoe supporting plate 11. This boot serves to keep dust and water out of the brake housing.

In Figure 3 the brake construction is quite similar to that which has just been described with the exception that it is designed for application to a rear wheel of a vehicle. The backing plate 76 is of somewhat different conformation to that shown in Figure 2. In order to properly coordinate with the brake shoes it will be noted, in Figures 1 and 2, that the cam bearing plates 39 and 44 are set at an angle corresponding to that of the brake cam 48 and the pivot pin. This requires that the slot 83 for securing the brake shoe to the wear plate 39 be made on an angle as shown since the brake shoes must conform to the brake drum. The wear plate 82 of Figure 3 is vertical but otherwise this construction is generally similar to that which has previously been gone over in detail.

In the adjustment of the brakes the nut 21 will be turned to retract the adjustable pivot or anchor member 14 and draw it toward the back plate 11. This will force the sloping ends 18 and 19 of the brake shoes 16 and 17 to ride up on the bottom of the milled slots 15 and thus separate the brake shoes. The brake shoes cannot move laterally with the member 14 since they bear against the faces of the rivets 13, or against the bottoms of the slots formed in the extended portion 25 of the fixed member 12. After the nut 21 has been rotated sufficiently so that the brake shoes are forced tightly against the brake drum, the nut 21 may then be rotated in the reverse direction a predetermined amount. This amount may be indicated by the clicks of the spring pressed ball carried in the drill hole 24. This backing off of the nut will serve to permit the brake shoes to be drawn inwardly by the spring 28 sufficiently to give them an adequate initial clearance from the brake drum.

The centralizing adjustment is made when the shoes have been forced against the drum by retracting the pivot 14 and it will be apparent that the entire operation is accomplished from outside the brake housing by adjustment of nuts on the rear of the supporting plate 11.

The brake supporting plate 11 is provided with a series of elongated holes 88, 89, 90 and 91 through which bolts extend to secure the plate to the axle member or supporting bracket. These holes are preferably located on parallel arcs so that the backing plate may be given an arcuate movement to secure the initial adjustment of the parts. The two holes 88 and 89 are on one arc, and the second pair of holes 90 and 91 on another parallel arc. These arcuate holes have the additional advantage that the circumferential thrust on the bolts due to the braking reaction on the plate is taken up by the bolts bearing against the sides of the openings to take up the thrust so that the tendency to slip the bolts which would be present if the holes were all parallel, is minimized. The adjustment is made on an arc and is relative to the axis of the wheel or rotating member being braked. Additional adjustment is given by means of the centralizer as above described.

While I have shown certain preferred embodiments of my invention, these are to be taken as illustrative only as the invention is capable of modification and change to adapt it to differing conditions and requirements and I contemplate such changes and modifications as come within the spirit and scope of the appended claims.

I claim:

1. In a brake construction, a support, a pivot thereon, a pair of shoes pivoted on the pivot, an operating cam engaging the free ends of the shoes, and a centralizer engaging one of the shoes, said centralizer being slidably adjustable on the support in a plane substantially parallel to that passing through the pivot and operating cam and engaging the shoe substantially in a plane perpendicular to the first mentioned plane and passing through the operating cam and its point of engagement with the shoe.

2. In a brake construction, a support, a brake shoe, a retaining member extending from the support through the brake shoe, spring means engaging the shoe, and means carried by the retaining member to limit movement of the spring means about the retaining member.

3. In a brake construction, a support, a brake shoe, a retaining member extending from the support through the brake shoe, a flat spring engaging the shoe, and a pin carried by the retaining member and engaging the spring to prevent rotation thereof.

4. In a brake construction, a support, a brake shoe, a retaining member extending from the support through the brake shoe, a flat spring bent upon itself and engaging both sides of the shoe, and a cotter pin carried by the retaining member and engaging a depression in the spring to prevent rotation thereof.

5. In a brake construction, a pair of pivoted brake shoes, a fixed anchor for both of said brake shoes, a floating cam between the free ends of said brake shoes diametrically opposite said anchor, spring means for urging both of said shoes into engagement with said cam and into released position, the spring means for one of said shoes being materially greater than the spring means acting upon the other shoe, an adjustable centralizer bearing against the shoe acted upon by the spring means having the greater force to center both of said shoes together with said cam, whereby the movement of said cam first expands the other of said shoes.

6. In a brake construction a pair of pivoted brake shoes, a fixed anchor for both of said shoes, a floating cam between the free ends of said shoes diametrically opposite said anchor, spring means for urging the shoes into engagement with said cam and into released position, an adjustable centralizer bearing against one of said shoes to center both of said shoes together with said cam and additional spring means normally urging said last-named shoe into engagement with said centralizer whereby the movement of said cam first expands the other of said shoes.

7. In a brake construction a pair of pivoted brake shoes, a fixed anchor for both of said shoes, a floating cam between the free ends of said shoes diametrically opposite said anchor whereby actuation of said cam causes one of said shoes to be a wrap shoe and the other of said shoes to be an unwrap shoe, an adjustable centralizer bearing against the wrap shoe to centralize both of said shoes together with said cam, spring means normally urging said shoes into engagement with said cam and additional spring means normally urging said wrap shoe into engagement with said centralizer whereby the movement of said cam first expands the unwrap shoe.

8. In a brake construction a rotatable brake drum, a relatively fixed backing plate, an anchor pin carried by said backing plate, a pair of brake shoes supported by said backing plate and bearing against said anchor pin, a rotatable cam between the free ends of said brake shoes diametrically opposite said anchor pin, said cam being free to move circumferentially with respect to said backing plate, spring means connecting said shoes for normally urging said shoes into engagement with said cam, an adjustable centralizer supported by said backing plate and bearing against one of said shoes and spring means extending between said last-named shoe and said backing plate to normally hold said shoe in engagement with said centralizer whereby the actuation of said cam first moves the other of said shoes into engagement with said brake drum.

9. In a brake construction a rotatable brake drum, a relatively fixed backing plate, a pair of brake shoes supported by said backing plate, an anchor pin supported by said backing plate, said shoes bearing at adjacent ends against said anchor pin, a rotatable expanding cam between the opposite ends of said brake shoes, said cam being free to move relative to said backing plate together with said shoe, a pair of springs extending between said shoes for normally holding said shoes in released position in engagement with said cam, an adjustable centralizer supported by said backing plate and bearing against one of said shoes, and a third spring extending between said last-named shoe and said backing plate whereby said last-named shoe presents a materially greater resistance to expansion than the other of said shoes.

10. In a brake construction, a fixed support, an anchor pin carried thereby, a pair of brake shoes engaging said anchor pin on opposite sides thereof, a cam between the free ends of said brake shoes and a centralizer engaging one of said shoes, said centralizer being slidably adjustable on the support in a direction substantially parallel to the line passing through the anchor and cam.

11. In a brake construction a rotatable brake drum, a relatively fixed backing plate, a pair of shoes supported by said backing plate, a channel-shaped guide rigid with respect to said backing plate and an adjustable centralizer for said brake shoes received within and slidable relative to said channel-shaped guide.

12. In a brake construction a rotatable brake drum, a relatively fixed backing plate, a pair of pivoted brake shoes supported by said backing plate, a cam between the free ends of said shoes diametrically opposite the pivot for said shoes and a centralizer slidably supported by said backing plate for movement in a direction substantially parallel to a line passing through the cam and the pivot for the shoes, said centralizer being accessible for adjustment from the exterior of said backing plate.

EDWIN R. EVANS.